(12) United States Patent
Barger

(10) Patent No.: US 6,173,803 B1
(45) Date of Patent: Jan. 16, 2001

(54) HIGH AMPLITUDE SOUND WAVE GENERATOR

(75) Inventor: James Edwin Barger, Winchester, MA (US)

(73) Assignee: GTE Service Corporation, Irving, TX (US)

(*) Notice: Under 35 U.S.C. 154(b), the term of this patent shall be extended for 0 days.

(21) Appl. No.: 09/348,383

(22) Filed: Jul. 7, 1999

(51) Int. Cl.$^7$ ........................................... G01V 1/40
(52) U.S. Cl. .................. 181/102; 181/106; 181/120; 181/121; 181/142; 181/402; 367/17; 367/18; 367/143; 367/153; 367/171
(58) Field of Search .................. 181/102, 105, 181/106, 113, 119, 120, 121, 142, 401, 402; 367/17, 18, 143, 144, 153, 171

(56) References Cited

U.S. PATENT DOCUMENTS

| | | | |
|---|---|---|---|
| 4,664,223 | * 5/1987 | Huizer et al. | 181/113 |
| 4,733,382 | * 3/1988 | Pascouet | 367/146 |
| 4,798,261 | * 1/1989 | Chelminski | 181/120 |
| 4,862,990 | * 9/1989 | Cole | 181/106 |
| 4,874,060 | * 10/1989 | Guerendel et al. | 181/102 |
| 4,875,545 | * 10/1989 | Pascouet | 181/115 |
| 4,928,783 | * 5/1990 | Crook | 181/106 |
| 5,018,598 | * 5/1991 | Sodich | 181/106 |
| 5,113,966 | * 5/1992 | Gregory et al. | 181/106 |

* cited by examiner

Primary Examiner—Robert E. Nappi
Assistant Examiner—Edgardo San Martin
(74) Attorney, Agent, or Firm—Leonard Charles Suchyta

(57) ABSTRACT

A method and device for generating a high amplitude sound wave is provided. The device includes a housing having an open end. A piston is slidably disposed in the open end of the housing and forms a chamber for holding a pressurized liquid. The pressurized liquid acts on the piston to move the piston relative to the housing. A latch is operable to fix the piston relative to the housing and to release the piston. Upon release of the latch, the piston moves relative to the housing to generate the sound wave. In the method of the present invention, a piston is fixed relative to a housing to form a chamber between the housing and the piston. The chamber is filled with a pressurized fluid and the piston is released to allow the pressurized fluid move the piston relative to the housing and generate the sound wave.

35 Claims, 11 Drawing Sheets

HIGH AMPLITUDE SOUND WAVE GENERATOR

The present invention was made partly with government funds under DARPA Contract N00014-93-C-0203. The government may have certain rights in the invention.

BACKGROUND OF THE INVENTION

The present invention relates to the field of sound wave generation. More particularly, the invention relates to a device for generating a high amplitude sound wave.

Sound waves propagate through a medium, such as land, air, or water with an amplitude that is representative of the energy of the sound wave. Sound waves that have an extremely high amplitude are commonly referred to as shock waves and have a large amount of energy. The large amplitude of the shock wave corresponds to a large leading edge pressure differential. Shock waves can be formed by sharp and violent disturbances within a medium, such as a lightning strike, an explosion, or supersonic flow over a body. When a shock wave is traveling through a medium and strikes a body residing in that medium, the shock wave delivers an impulse to the body that is a function of the speed of the shockwave, the pressure differential of the shock wave, and the time span of the shockwave.

There are many circumstances in which it is desirable to produce a high amplitude sound wave or a shock wave. Seismic visualization of marine oil reservoirs is one example. Seismic visualization is a technique used to determine the size and shape of underground oil reservoirs. The technique involves radiating sound waves into the earth's surface above the reservoir and then capturing the reflected waves. The characteristics of the reflected waves can then be analyzed to visualize the size and shape of the underground reservoir as well as the geological formations in the area surrounding the reservoir. This technique is useful when exploring for new oil reservoirs and also for managing oil production from a known oil reservoir. A sound wave having a large amplitude will penetrate deeper into the ground and provide a greater representation of the underground reservoir.

It has also been found that high amplitude sound waves can be used to neutralize explosive mines in both land and water. A sharp impulse, such as that of a high amplitude sound wave, that is delivered to an explosive mine, can rupture the mine casing and render the mine ineffective. Thus, an area suspected of containing explosive mines may be cleared by radiating high amplitude sound waves into the area to neutralize the mines.

Currently, explosives are used to generate high amplitude sound waves for use in these types of applications. However, in underwater applications, the use of explosive devices is very unfriendly to the underwater environment. In addition, it is very difficult to precisely direct and focus a sound wave generated by an explosive device. Moreover, once the explosive charge in an explosive device is used, the explosive charge must be replaced prior to generating another sound wave.

In light of the foregoing there is a need for an environmentally friendly, re-useable and focusable high amplitude sound wave generating device.

SUMMARY OF THE INVENTION

Accordingly, the present invention is directed to a device for generating a high amplitude sound wave. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a device for generating a high amplitude sound wave. The device includes a housing having an open end and a piston. The piston is slidably disposed in the open end of the housing and forms a chamber within the housing for holding a pressurized liquid. The pressurized fluid creating a first force that acts on the piston to move the piston relative to the housing. A latch is provided to fix the position of the piston relative to the housing and to release the piston to allow the piston to move relative to the housing in response to the force of the pressurized liquid and generate the sound wave.

According to another aspect, the invention is directed to a method of generating a high amplitude sound wave. The method involves fixing a piston within a housing with a latch, the piston and housing defining a charging chamber. Fluid within the chamber is pressurized to exert a force on the piston. The latch is released to allow the force of the pressurized fluid to move the piston relative to the housing and generate the sound wave.

In another aspect, the invention is directed to a device for generating a high amplitude sound wave that includes a charging chamber between the piston and the housing for holding fluid at a first pressure that exerts a first force on the piston. A disc is connected to the piston and forms a firing chamber for holding fluid at a second pressure that exerts a second force on the piston. The second force is greater than the first force and prevents the piston from moving relative to the housing. A valve is provided for releasing fluid from the firing chamber until the second force is less than the first force and the fluid in the charging chamber acts on the piston to move the piston and disc relative to the housing to generate the sound wave.

In still another aspect, the invention is directed to a device for generating a high amplitude sound wave that includes a latching means for selectively fixing the piston to the housing. The latching means is further operable to release the piston, thereby allowing the piston to move relative to the housing in response to the force of the pressurized liquid and generate the sound wave.

In yet another aspect, the invention is directed to a system for generating a high amplitude sound wave. The system includes a frame and a plurality of housings mounted on the frame. Each of the plurality of housings has an open end and slidably mounts a piston to form a charging chamber. The charging chamber of each housing is configured to hold a pressurized liquid that acts on the corresponding piston to move the corresponding piston relative to the housing. There is also provided a plurality of latches. One of the plurality of latches is disposed on each of the plurality of housings. Each of the latches is operable to fix one of the pistons relative to one of the housings and to release the one piston, thereby allowing the one piston to move relative to the one housing in response to the force of the pressurized liquid and generate the sound wave.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 2b is an end view of the housing of FIG. 2a;

FIG. 3b is a cross sectional view of the device of FIG. 3a taken along line B—B of FIG. 3a.;

FIG. 5b is a sectional view of the piston of FIG. 5a;

FIG. 6b is a top view of the piston of FIG. 6a;

FIG. 8b is a side view of the radiating surface of FIG. 8a;

FIG. 8c is an end view of the radiating surface of FIG. 8a;

FIG. 10b is a side view of the system of FIG. 9a;

DETAILED DESCRIPTION

Reference will now be made in detail to the presently preferred embodiments of the invention, examples of which are illustrated in the accompanying drawings. Wherever possible, the same reference numbers will be used throughout the drawings to refer to the same or like parts.

In accordance with the present invention, a device for generating a high amplitude sound wave is provided. The generated sound wave may be propagated in land or water in any application that requires a high-powered sound wave. As described in more detail below, the present invention also contemplates the use of a series of sound wave generating devices, working together as an array, to produce a high amplitude sound wave or a series of high amplitude sound waves. An exemplary embodiment of the device of the present invention is shown in FIG. 1 and is designated generally by reference number 20.

Figure 1:
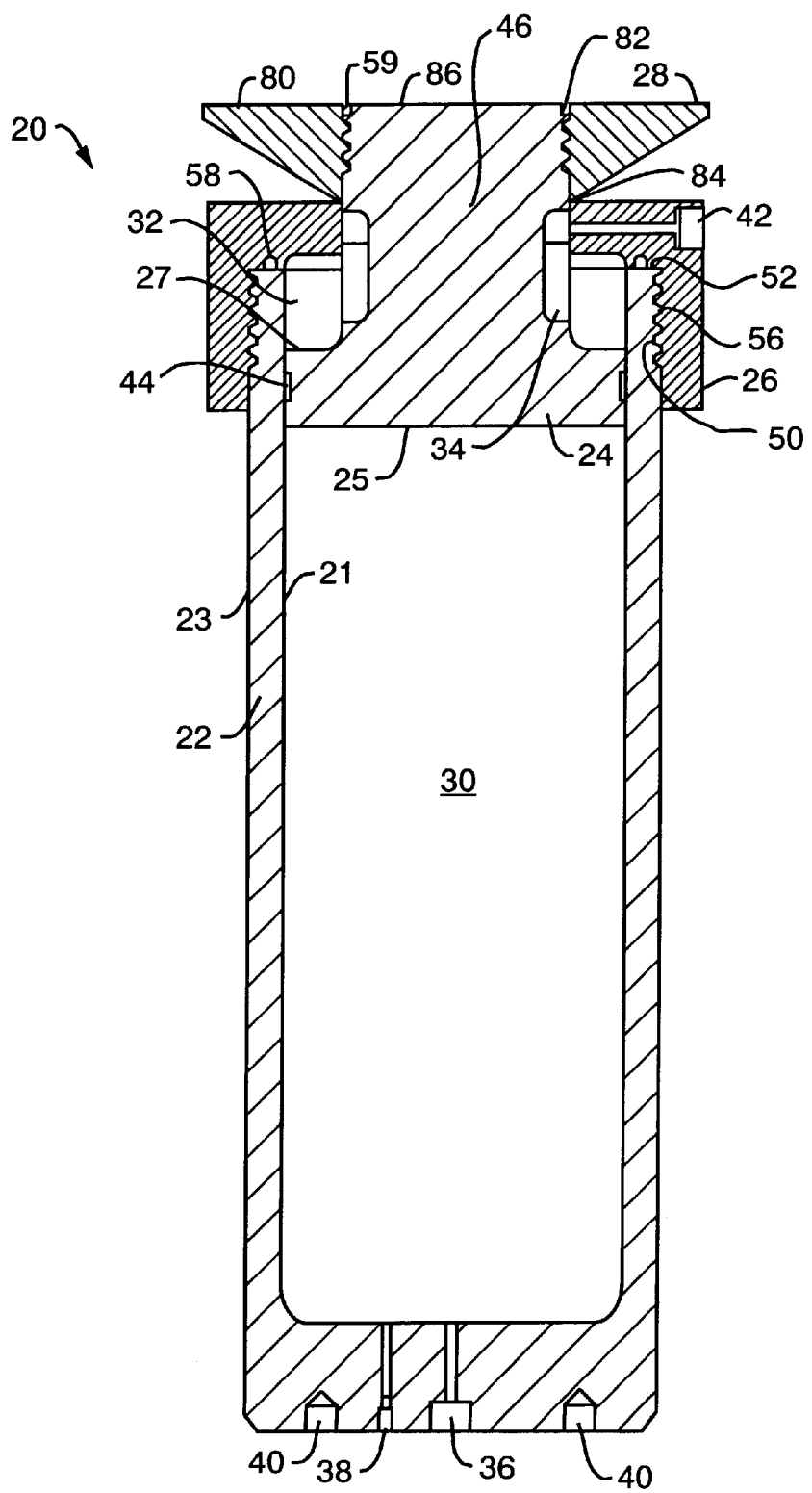
FIG. 1 is a cross sectional view of a device for generating a high amplitude sound wave in accordance with the present invention.

As embodied herein and illustrated in FIG. 1, device 20 includes a housing 22 having an open end. In the presently preferred embodiment illustrated in FIGS. 2a and 2b, housing 22 has a cylindrical shape. However, the present invention contemplates that housing 22 may have any other appropriate shape.

As shown in FIG. 1, a piston 24 is slidably disposed within the open end of housing 22. Piston 24 forms a charging chamber 30 that is defined by an inner surface 25 of the piston 24 and an inner wall 21 of housing 22. Piston 24 includes a recess 44 configured to receive a seal, which is preferably an 'O' ring or 'V' ring seal. The engagement of the seal with inner wall 21 of housing 22 prevents operating fluid from escaping from charging chamber 30.

In accordance with the present invention, charging chamber 30 is filled with an operating fluid and pressurized to a predetermined level. It is contemplated that, as further described below, the fluid will be pressurized to approximately 20 ksi. Preferably, the operating fluid will be water, although any of a variety of other types of fluids, including, but not limited to gases and other liquids, such as oil, may be used as the operating fluid. However, when the present invention is used to generate high amplitude sound waves in a water application, operating liquids other than water may present a hazard to the surrounding environment, if any of the operating fluid leaks from the device.

In addition, the use of a gas as the operating fluid may present safety concerns. Because gases are more compressible than fluids, a larger volume of a gas is required to achieve the desired pressure in the charging chamber. This presents a potential hazard if the housing fails under the pressure of the operating fluid. The resulting explosion of gas would be far more dangerous than a similar explosion of liquid. For these reasons, the preferred operating fluid is water.

Figure 2A:
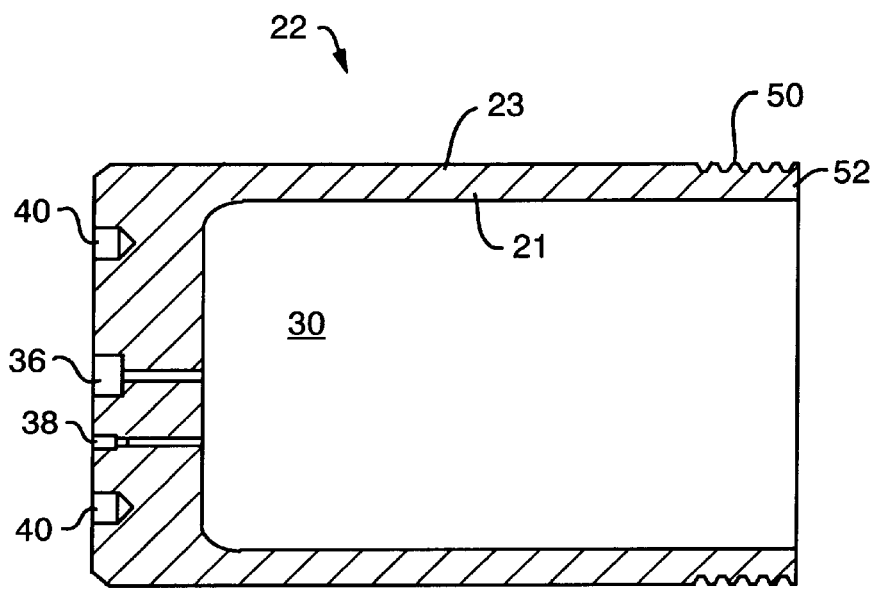
FIG. 2a is a cross sectional view of a housing according to the present invention.
Figure 2B:
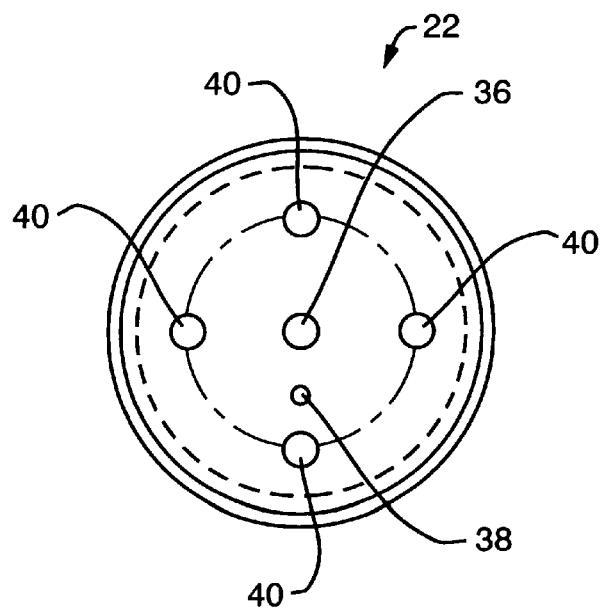

As shown in FIG. 2a, housing 22 includes a pressurizing port 36 and a gauge port 38. Pressurizing port 36 is configured to receive a connection to a high pressure water pump. Gauge port 38 is configured to receive a pressure gauge to monitor the pressure of the fluid in charging chamber 30. It is contemplated that any of a variety of known high pressure pumps and pressure gauges may be connected to pressurizing port 36 and gauge port 38. Preferably, the pump will have the ability to pressure an operating fluid, such as water, to the required pressure of approximately 20 ksi. A system for providing the high pressure fluid will be discussed in greater detail below.

Figure 3A:
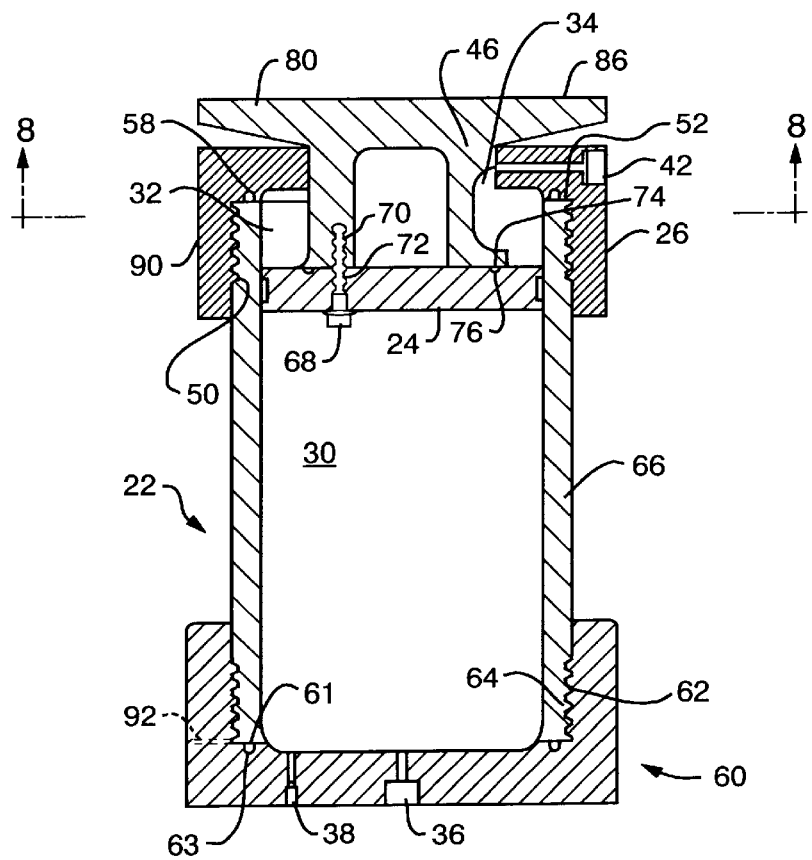
FIG. 3a is a cross sectional view of another embodiment of a device for generating a high amplitude sound wave having a large amplitude taken along line A—A of FIG. 3b.
Figure 3B:
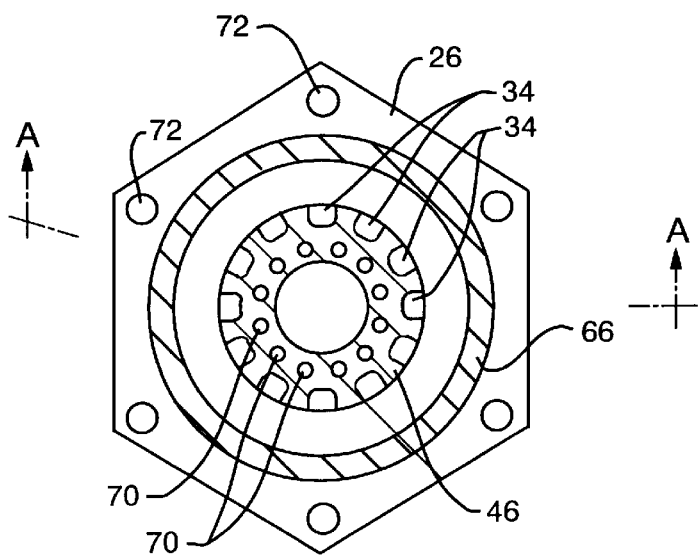

It is contemplated that housing 22 may be constructed of a single unit, as illustrated in FIG. 1. Alternatively, as illustrated in FIG. 3a, housing 22 may have a mulit-part construction. In this alternative embodiment, housing 22 includes a cylindrical structure 66 having an additional set of threads 64 at the pressurizing end of the housing and a cap 60. Cap 60 includes a corresponding set of threads 62. Engagement of threads 62 of cap 60 with threads 64 of cylindrical structure 66 connects the two parts.

Cylindrical structure 66 includes a sealing projection 61 configured to engage a recess 63 in cap 60. Preferably, recess 63 contains a high-pressure static seal, such as, for example, an 'O' ring or 'V' ring. When cap 60 is torqued onto cylindrical structure 66, sealing projection 61 mates with recess 63 to form a seal to prevent pressurized fluid from escaping charging chamber 30. A weep hole 92 provides a fluid connection from the low-pressure side of the seal near threads 62 and 64 to the environment. Weep hole 92 allows any pressurized fluid that leaks through the seal to escape to the environment without causing any damage or creating a safety hazard.

This modular embodiment of the housing allows easy interchangeability of the central cylindrical piece. For example, the central cylindrical piece of a certain length may be easily exchanged for a piece having a different length. By exchanging differently sized cylindrical pieces, the characteristics of the sound wave generated by the device may be changed to fit different needs of different applications.

In accordance with the present invention a latch is provided to fix the piston relative to the housing. In the embodiment illustrated in FIG. 1, the piston is fixed relative to the housing by pressurizing a fluid in a firing chamber on the opposite side of the piston from the charging chamber. The preferable firing chamber pressure is twice the pressure of the charging chamber. The piston is released by allowing fluid to escape the firing chamber until the force exerted on the piston by the fluid in the firing chamber is less than the force exerted on the piston by the fluid in the charging chamber. The pressure in the charging chamber then acts on the firing chamber to move the piston towards the open end of the housing and generate the sound wave.

Figure 4A:
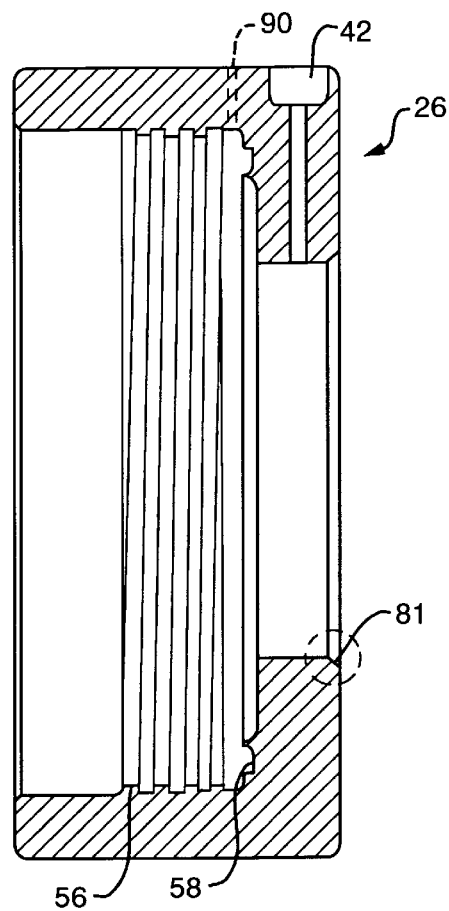
FIG. 4a is a cross sectional view of a collar according to the present invention.

As illustrated in FIG. 1, a firing chamber 32 is formed between the outer surface 27 of piston 24, inner wall 21 of housing 22, and a collar 26. As shown in FIG. 4a, collar 26 includes a set of threads 56 and a recess 58 that are configured to engage a corresponding set of threads 50 disposed around the open end of housing 22 and a sealing projection 52 (referring to FIG. 3a). Preferably, recess 58 contains a high-pressure static seal, such as, for example, an 'O' ring or 'V' ring. Thus, connection of sealing projection 52 of housing with recess 58 of collar 26 forms a seal to prevent pressurized fluid from escaping firing chamber 32.

A weep hole 90 provides a fluid connection from the low-pressure side of the seal near threads 50 and 56 to the environment. Weep hole 90 allows any pressurized fluid that leaks through the seal to escape to the environment without causing any damage to the device or creating a safety hazard.

Collar 26 also includes a passageway 42 configured for connection with a high pressure pump. The present invention contemplates that the firing chamber will be filled with a fluid, preferably a liquid fluid such as water for the environmental and safety reasons discussed above. The preferable pressure of the firing chamber is approximately 40 ksi.

Figure 5B:
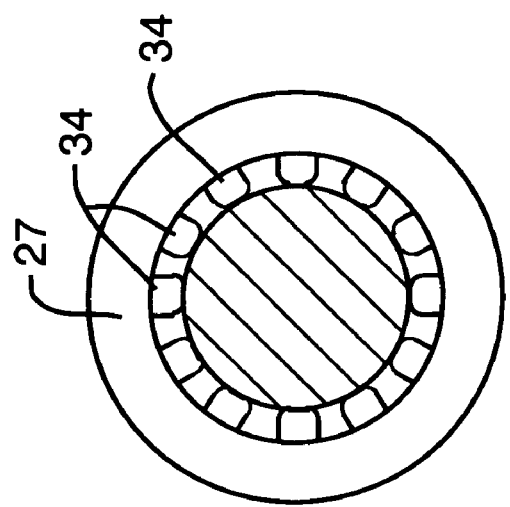
Figure 5A:
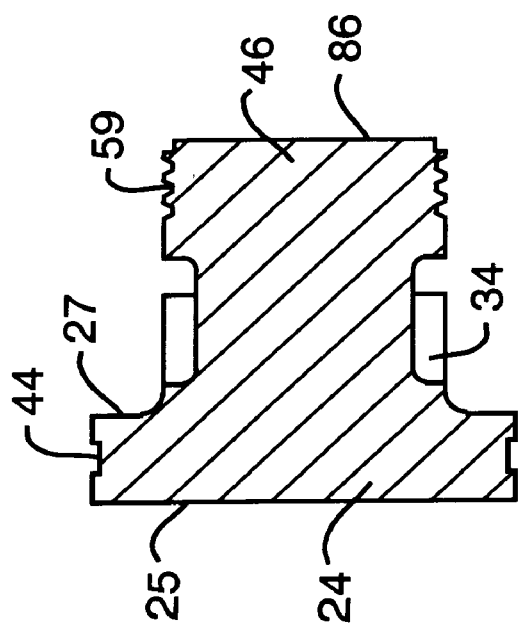
FIG. 5a is a cross sectional view of a piston according to the present invention.
Figure 6A:
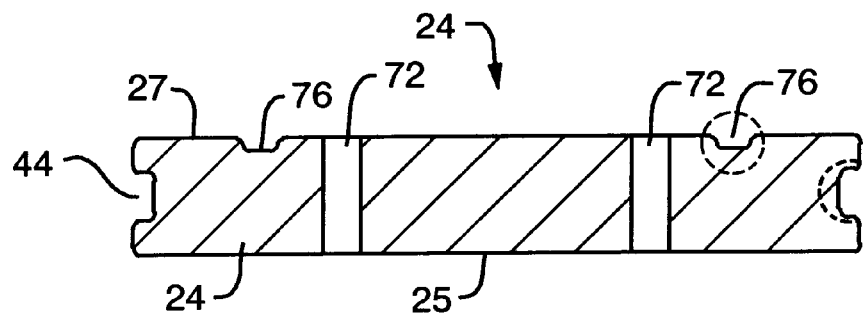
FIG. 6a is a cross sectional view of another embodiment of a piston according to the present invention.
Figure 6B:
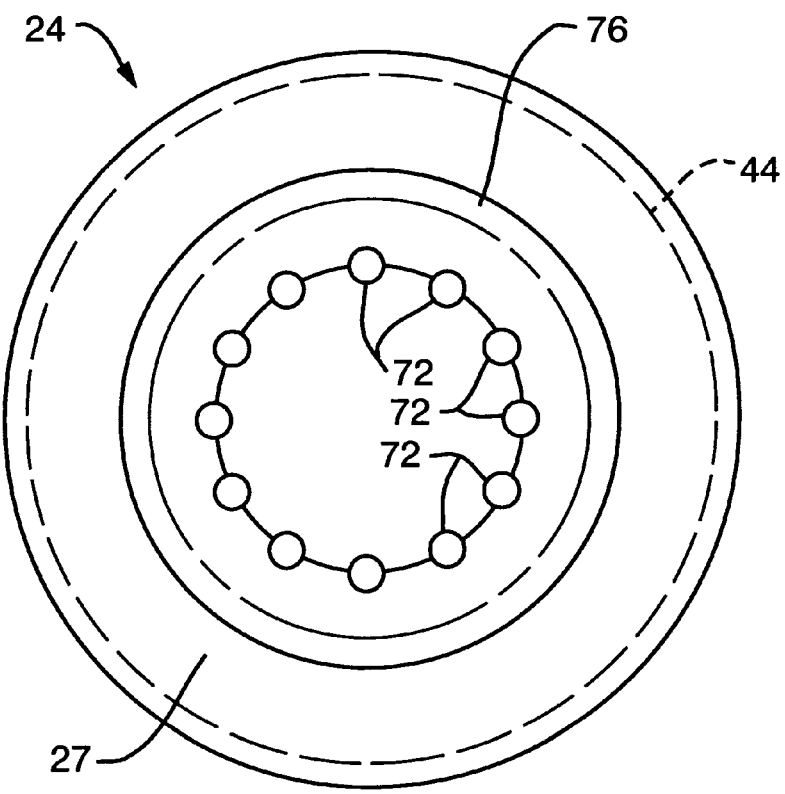

As illustrated in FIGS. 1 and 5a, a shaft 46 extends from outer surface 27 of piston 24. Piston 24 and shaft 46 may be a single structure as illustrated in FIG. 5a or, alternatively, piston 24 and shaft 46 may be separate pieces as illustrated in FIG. 3a. As further illustrated in FIGS. 6a and 6b, piston 24 includes a series of bolt holes 72 and an annular groove 76. Shaft 46 includes a projection 74 corresponding to annular groove 76. Bolts 68 may be disposed through bolt holes 72 and into corresponding threaded holes 70 in shaft 46 to connect the shaft to the piston. While the illustrated embodiment uses bolts to connect piston 24 and shaft 46, it is contemplated that any other readily apparent connecting device or system may be used to connect these parts.

As shown in the embodiment of FIG. 5a, shaft 46 includes a set of threads 59 and an outer radiating surface 86. Shaft 46 also includes a series of grooves 34. As shown in FIG. 5b and for reasons discussed in greater detail below, grooves 34 are preferably evenly spaced around shaft 46.

Figure 7:
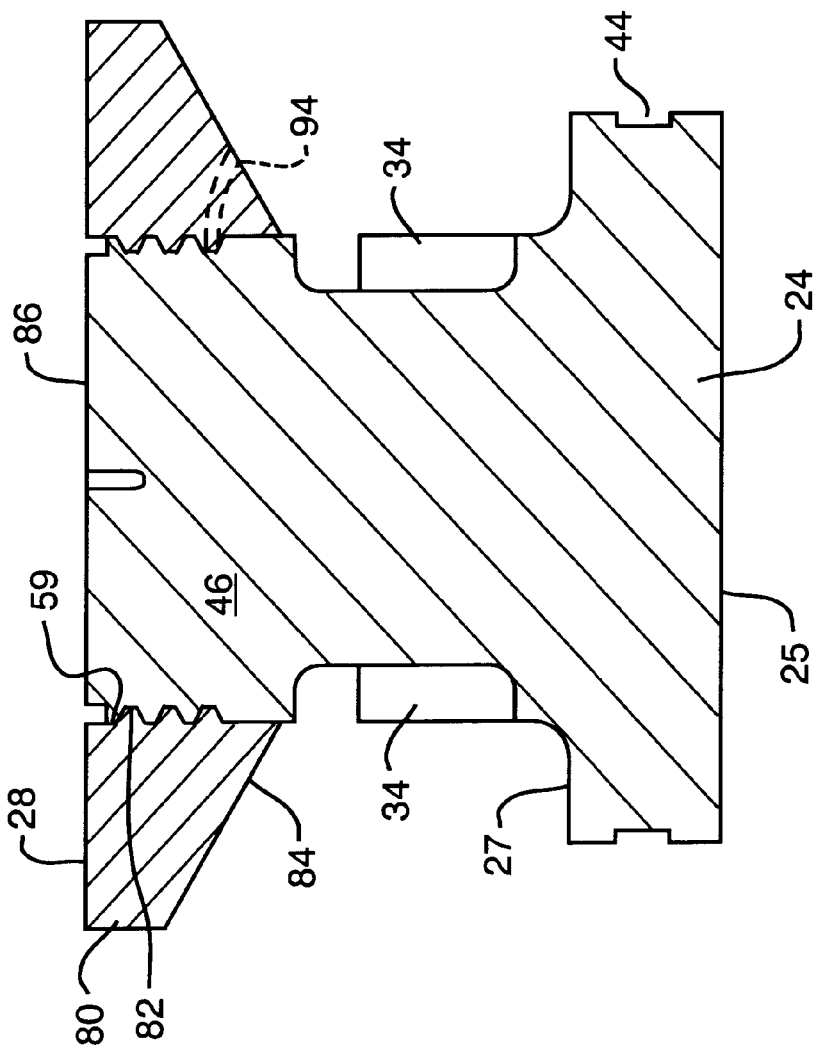
FIG. 7 is a cross sectional view of a piston and a radiating surface in accordance with the present invention.
Figure 8A:
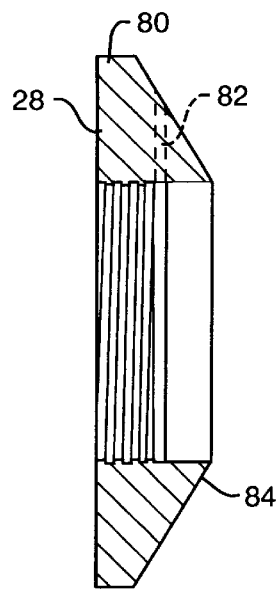
FIG. 8a is a cross sectional view of a radiating surface according to the present invention.
Figure 8B:
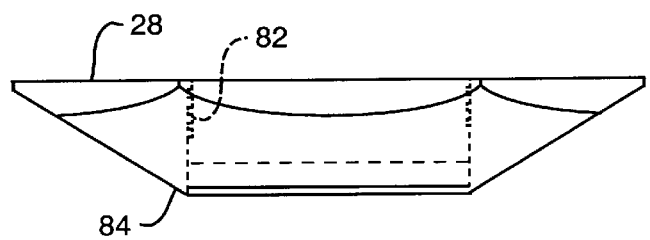
Figure 8C:
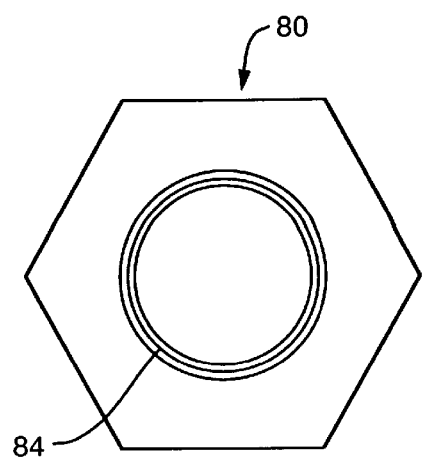

As shown in FIG. 7, a disc 80 is connected to shaft 46. Disc 80 also has a set of threads 82 that engage the corresponding threads 59 on shaft 46. Engagement of threads 82 with threads 59 connects the disc 80 to shaft 46. Preferably, the engagement of disc 80 with shaft 46 forms a continuous co-planar outer radiating surface 28 and with surface 86. As described in greater detail below, it is contemplated that alternatively shaped radiating surfaces may be formed by the engagement of the disc 80 and shaft 46. For example, the outer radiating surface may be angled with respect to piston 24 or may have a hemispherical shape. In addition, the outer radiating surface may have surface irregularities, such as grooves or baffles.

Figure 4B:
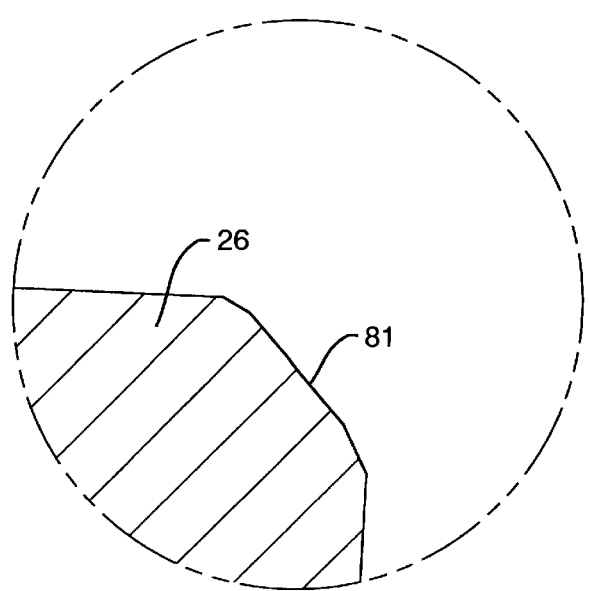
FIG. 4b is a partial cross sectional view of the collar of FIG. 4a, illustrating a seal portion of the collar.

As also shown in FIG. 7, disc 80 includes a sealing surface 84 configured to engage a corresponding sealing surface 81 (referring to FIGS. 4a and 4b) on collar 26. The pressurized fluid within firing chamber 32 acts on piston 24 to move piston 24, shaft 46, and disc 80 away from the open end of housing 22 until shaft 46 contacts collar 26.

The force of the pressurized fluid in the firing chamber forces sealing surface 84 into engagement with sealing surface 81 to create a seal therebetween. Preferably, sealing surfaces 81 and 84 are angled at approximately 45° with respect to the direction of motion of the shaft to prevent the shaft from slipping along the collar under the force of the firing chamber fluid. The angled surface also provides a relatively small area of engagement between the sealing surfaces, thereby increases the resulting force between the surfaces and increasing the strength of the seal. In the illustrated embodiments, the respective sealing elements are metal and the seal is formed through metal to metal contact. It is contemplated that alternative sealing devices may also be used to prevent fluid from escaping firing chamber 32.

Preferably, a weep hole 94 provides a fluid connection from the low-pressure side of the seal from threads 59 and 82 to the environment. Weep hole 94 allows any pressurized fluid that leaks through the seal between sealing surfaces 81 and 84 to escape to the environment without causing any damage or creating a safety hazard.

Figure 9:
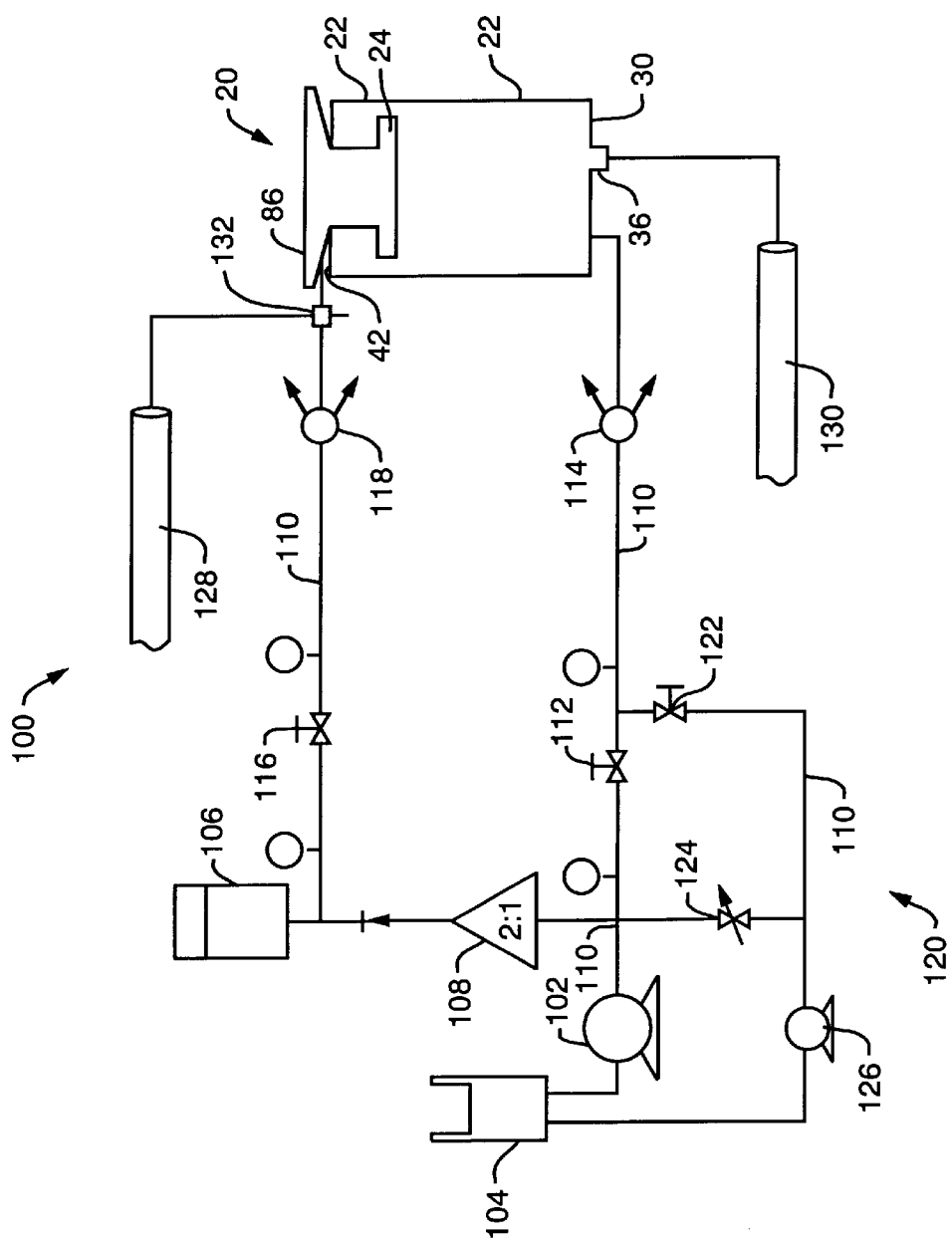
FIG. 9 is a schematic diagram of a system for supplying pressurized fluid to a device according to the present invention

An exemplary embodiment of a pressurizing system 100 for providing pressurized fluid to both the firing chamber and the charging chamber is illustrated in FIG. 9. As shown, a pump 102 is connected to both charging chamber 30 and firing chamber 42 and to a supply tank 104 that holds a quantity of supply fluid by fluid conduit 110. Preferably, pump 102 is capable of pressurizing the operating fluid to a pressure of at least 20 ksi and may be of any variety readily apparent to one skilled in the art.

The fluid conduit between pump 102 and charging chamber 30 contains a charging valve 112 and a low-pressure manifold 114, which, as described in greater detail below, is used when a plurality of devices 20 are combined in a system. Charging valve 112 may be opened and closed to control the flow of fluid to charging chamber 30.

The fluid conduit between pump 102 and firing chamber 42 contains an intensifier 108, an accumulator 106, a sealing valve 116, a firing valve 132, and a high-pressure manifold 118, which, as described in greater detail below, is used when a plurality of devices 20 are combined in a system. Intensifier 108 operates at a 2:1 ratio to increase the pressure of the supply fluid from 20 ksi to approximately 40 ksi. Sealing valve 116 and firing valve 132 may be opened and closed to control the flow of pressurized fluid to firing chamber 42.

A drainage system 120 is provided to handle any leakage or back flow from the pressurizing system 100 and to reset piston 24 within housing 22. Drainage system 120 includes a reset valve 122, a back-pressure regulator 124, and a drain pump 126. If fluid back flows from pressurizing system 100 at a pressure of greater than 20 ksi, back pressure regulator 124 opens to allow the excess fluid to escape to drain pump 126. Drain pump 126 then pumps the fluid back to supply tank 104. Reset valve 122 may be opened and charging valve 112 closed to place drain pump 126 in connection with charging chamber 30.

The operation of the aforementioned device will now be described with reference to the attached drawings. As illustrated in FIG. 1, device 20 is in a charged state, where charging chamber 30 contains fluid pressurized to approximately 20 ksi and firing chamber 32 contains fluid pressurized to approximately 40 ksi. The resulting force on piston 24 moves sealing surface 84 of shaft 46 into contact with collar 26. The firing sequence is initiated by opening firing valve 132 (referring to FIG. 9). Opening this valve allows fluid to release from firing chamber 32 to the external environment or to an external reservoir.

The release of fluid from firing chamber 32 steadily reduces the pressure within firing chamber 32 and, thus, the force acting on piston 24. When the magnitude of the force acting on piston 24 drops to a level that is less than the magnitude of the force exerted on the piston by the fluid in charging chamber 30, the latch is opened. In response to the force of the fluid in charging chamber 30, piston 24 starts to move outwardly within housing 22. The movement of piston 24 from housing breaks the seal between shaft 46 and collar 26. Grooves 34 are positioned around shaft 46 to create additional openings through which fluid may escape from the firing chamber. Because fluid may flow freely from firing chamber 32, the force of the pressurized fluid in the charging chamber 30 acts on piston 24 without any significant resistance in addition to the resistance of the water surrounding disc 80. Thus, the full force of the pressurized fluid, which is expected to be on the order of 80 tons, acts on the piston driving it forward, thereby creating a pulse, or sound wave, within the surrounding water.

The impulse of the sound wave is defined as the time integral of the pressure of the sound wave:

$$I(t) = \int_0^\tau p(t)dt \quad (1)$$

The radiated pressure of the sound wave along the axis of the device is given by:

$$p(t) = \rho c \left[ v\left(t - \frac{z}{c}\right) - v\left(t - \frac{\sqrt{z^2 + a^2}}{c}\right) \right] \quad (2)$$

where
v(t) is the piston velocity;
z is the distance from the piston along the axis of the device; and
a is the piston radius.

Equations 1 and 2 can be combined to determine the impulse at a given distance from the device. For example, at a location (Z) that is several radii (a) from the piston, the equations can be combined to give:

$$I(t) = \frac{\rho S}{2\pi Z} v\left(t - \frac{Z}{c}\right) \quad (3)$$

where,
S is the surface area of the radiating surface; and
Z is the distance from the piston.

It should be noted that the number, size, and shape of grooves 34 may be modified to vary the acceleration and timing of the movement of piston 24. In this manner, the velocity of the sound wave, v(t), may be altered to create sound waves having different characteristics. For example, it may be desirable to create a sound wave where, initially, the leading edge of the generated sound wave has a relatively low amplitude and the amplitude gradually increases to a peak at the trailing edge of the sound wave. The leading edge of such a sound wave will travel at a slower speed than the remaining portions of the wave. Thus, the rear end of the wave, having the larger amplitude, will catch up to the leading edge as the wave propagates through the medium. Eventually, the portion of the wave with the greatest amplitude will catch up to the leading edge. At this time, the sound wave is a shock wave and will deliver the greatest impulse to a body in its path. Thus, by varying the initial shape of the wave, the point at which the wave reaches its greatest amplitude can also be varied. In this manner, the focal point of the wave can be adjusted so that the generated sound wave becomes a shock wave at a certain distance, or a certain time, in propagation from the device.

After device 20 has fired to generate the sound wave, device 20 need then be reset. To reset device 20, sealing valve 116 and charging valve 112 are closed and reset valve 122 is opened to place drain pump 126 in connection with charging chamber 30. The action of drain pump 126 returns piston 24 to its charging position, where shaft 46 is engaged with collar 26 to form a seal for firing chamber 32.

Pump 102 fills accumulator 106 with pressurized fluid. After drain pump has reset piston 24, reset valve 122 is closed and sealing valve 116 is opened. Accumulator 106 forces fluid into firing chamber 32 at approximately 5 ksi to further set shaft 46 against collar 26. Charging valve 112 is then opened and pump 102 forces fluid through intensifier 108 to pressurize firing chamber 32 to approximately 40 ksi and into charging chamber 30 to pressurize charging chamber 30 to approximately 20 ksi. The system is fully pressurized when back-pressure regulator 124 opens at 20 ksi. In addition a pressure monitor 130 may be connected to charging chamber to monitor the pressure and determine when the system is fully pressurized.

In accordance with the present invention, a control system is also provided to control the operation of device 20. The basic function of the control system is to open firing valve 132 to initiate the firing sequence, as described in greater detail below, of device 20. In this embodiment, the control system is connected to firing valve 132 with a cable 128.

However, it is contemplated that the control system may be a more complex, computer-based system that oversees additional operations of the system as well. For example, the control system may govern the opening and closing of the valves in the pressurizing system to control the reset procedure of the device. In addition, the control system may measure the time needed for the device to fire from the opening of the firing valve 132. As described above, there is a delay between the opening of the firing valve and the actual firing of the device. This delay occurs as fluid escapes from the firing chamber until the pressure in the firing chamber drops below the pressure in the charging chamber. Different devices may have different delays. Preferably, the control system keeps a record of the delay for each particular device. In this manner, the control system may predict the time at which each device will fire.

Figure 11:
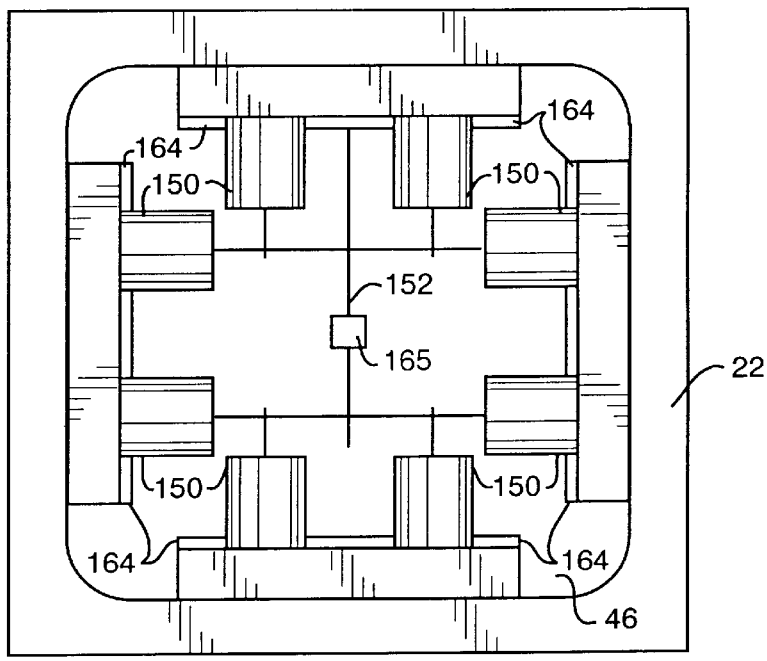
FIG. 11 is a plan view of another embodiment of a latch according to the present invention.
Figure 12:
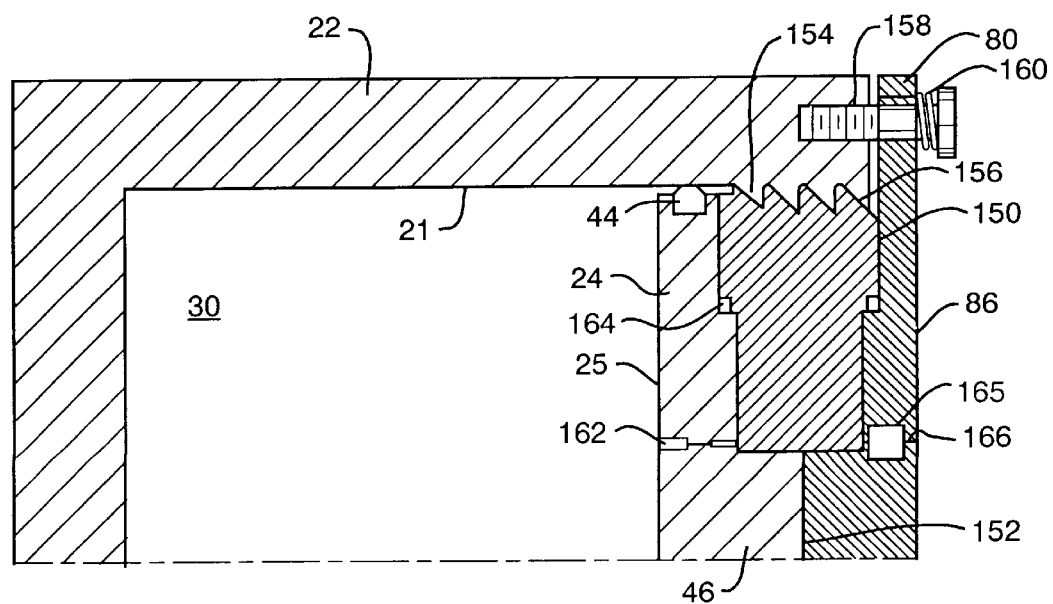
FIG. 12 is a partial cross sectional view of the latch of FIG. 11.

An alternative embodiment of the latch of the present invention is illustrated in FIGS. 11 and 12. As shown in FIG. 11, a series of pistons 150 are positioned in shaft 46. In the illustrated embodiment, eight pistons are positioned symmetrically around perimeter of shaft 46. As illustrated in FIG. 12, each piston 150 includes a series of parallel, or non-helical threads 156 that are configured to engage corresponding threads 154 on the inner wall 21 of housing 22.

Pistons 150 are slidably disposed within chambers 164. Chambers 164 are interconnected by fluid conduits 152. Fluid conduits 152 are connected to charging chamber 30 by orifice 162 and to the environment by orifice 166. A valve 165 is disposed in orifice 166 and may be opened to provide a passageway from chambers 164 to the environment or closed to block the passageway from chambers 164 to the environment.

A plurality of bolts 158 (only one of which is illustrated in FIG. 12) are disposed through disc 80 and engage housing 22. The length of the bolts controls the motion of disc 80 with respect to housing 22. A spring 160 is positioned between each bolt head and the disc. The springs act on the disc to move disc 80, shaft 46, and pistons 150 to align threads 156 of piston 150 with threads 154 of housing 22.

When threads 156 of piston 150 are aligned with threads 154 of housing 22 and pressurized fluid is introduced into the charging chamber 30, the pressurized fluid will also enter chambers 164 through orifice 162. The force of the pressurized fluid will move piston 150 so that threads 156 of piston 150 engage threads 154 of housing 22 to fix piston 24 and disc 80 relative to the housing.

After charging chamber 30 is fully pressurized, the latch may be released by opening valve 165 to allow fluid to escape from chambers 164 to the environment. The continued force of the pressurized fluid in charging chamber 30 acts on the angled surfaces of threads 154 and 156 to move threads 156 of piston 150 out of engagement with threads 154 of housing 22. The force of the pressurized fluid then moves piston 24 with respect to housing 22 to generate the sound wave.

Figure 10B:
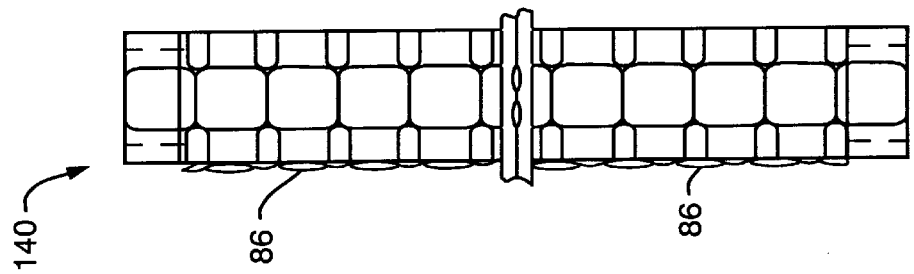
Figure 10A:
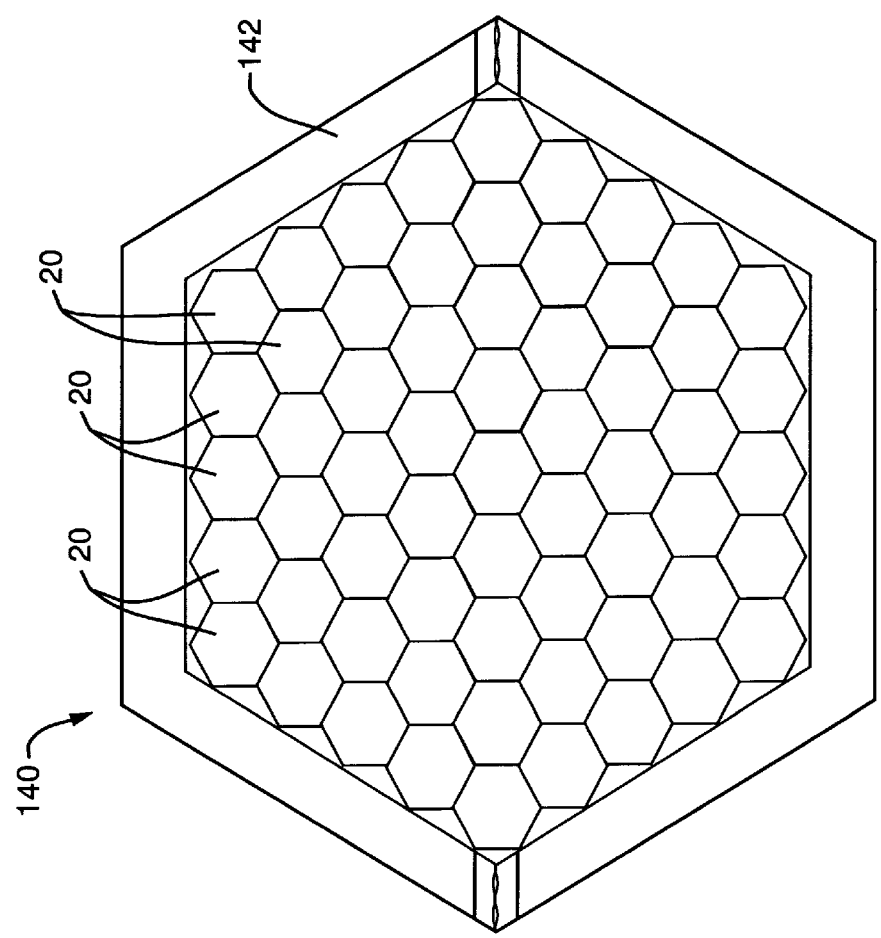
FIG. 10a is a sectional view of a system containing a plurality of devices for generating a high amplitude sound waves in accordance with the present invention.

Further in accordance with the present invention, a plurality of devices may be joined together to form a larger system. FIGS. 10a and 10b illustrate one embodiment that includes an array 140 of devices 20, where 61 devices are combined into a hexagonal shape. Each radiating surface 86 of each device has a hexagonal shape that allows the combination of devices to form a continuous plane. It should be noted, however, that the present invention contemplates that each radiating surface may have a different shape. For example, those devices on the perimeter may have slanted or angled surfaces to create a generally concave surface to increase the power of the generated sound wave. It should be noted that the optimum efficiency of the device of the present invention is achieved when the area of the radiating surface is equivalent to the area of the inner surface 25 of piston 24. In the array of FIG. 10, the area of inner surface 25 is limited by the thickness of housing 22 and of collar 26. Thus, it is preferable to use a strong material to construct the housing and collar to minimize the thickness of these parts.

The array of devices is pressurized by the pressurizing system illustrated in FIG. 9 and described above. High pressure manifold 118 provides a connection between pump 102 and the firing chambers of each device. Similarly, low pressure manifold 114 provides a connection between pump 102 and the charging chambers of each device.

Preferably, the control unit governs the opening of firing valve 132 of each device 20 individually. As discussed above, each device has a delay between the opening of the firing valve and the actual firing of the device. The control device maintains a history of the delays for each particular device and, thus, can predict with reasonable accuracy the amount of time required from the opening of the firing valve until the device fires. Preferably, the control system opens the firing valves of each of the devices so that they fire within 0.2 ms of each other to create the sound wave.

It will be apparent to those skilled in the art that various modifications and variations can be made in the construction of this sound generation device without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for generating a high amplitude sound wave, comprising:

a housing having an open end;

a piston slidably disposed in the open end of the housing and forming a charging chamber within the housing for holding a pressurized fluid, the pressurized fluid exerting a first force on the piston;

a seal disposed between the piston and the housing;

a disc connected to the piston and forming a firing chamber, the firing chamber for holding pressurized fluid acting to exert a second force on the piston; and a valve operable to release fluid from the firing chamber until the second force is less than the first force and the fluid in the charging chamber acts on the piston to move the piston and disc relative to the housing to generate the sound wave.

2. The device of claim 1, wherein the housing includes a threaded portion and a cap having corresponding threads configured to engage the threaded portion.

3. The device of claim 2, wherein the housing has a cylindrical shape.

4. The device of claim 1, wherein the housing includes a pressurizing port and a gauge port.

5. The device of claim 4, further comprising a pump connected to the pressurizing port to supply pressurized fluid to the charging chamber and a pressure gauge disposed in the gauge port to sense the pressure of the fluid in the charging chamber.

6. The device of claim 5, wherein the pump pressurizes the fluid in the charging chamber to about 20 ksi.

7. The device of claim 6, wherein the fluid is water.

8. A device for generating a high amplitude sound wave, comprising:

a housing having an open end;

a piston slidably disposed in the open end of the housing and forming a charging chamber within the housing for holding a pressurized fluid, the pressurized fluid creating a first force that acts on the piston to move the piston relative to the housing; and a latch operable to fix the position of the piston relative to the housing and to release the piston, thereby allowing the piston to move relative to the housing in response to the force of the pressurized liquid and generate the sound wave, the latch including a disc connected to the piston and configured to form a firing chamber on the opposite side of the piston from the charging chamber, the firing chamber configured to hold pressurized fluid, the pressurized fluid in the firing chamber creating a second force acting on the piston, wherein the second force is greater than the first force.

9. The device of claim 8, further comprising a valve in fluid connection with the firing chamber, the valve operable to release fluid from the firing chamber until the second force is less than the first force.

10. The device of claim 8, further comprising a pump and an intensifier, the pump and intensifier configured to provide pressurized fluid to the firing chamber.

11. The device of claim 9, wherein the fluid in the firing chamber is pressurized to about 40 ksi.

12. The device of claim 8, wherein the disc has a hexagonal shape.

13. The device of claim 8, wherein the disc has a radiating surface and the radiating surface is substantially flat.

14. The device of claim 8, wherein the disc has a radiating surface and the radiating surface has a hemispherical shape.

15. The device of claim 8, wherein a shaft connects the disc to the piston, the shaft including grooves configured to vent fluid from the firing chamber when the piston starts to move with respect to the housing.

16. The device of claim 15, further comprising a collar disposed at the open end of the housing, the collar having an opening configured to receive the shaft such that the shaft engages the collar to form a seal when the fluid in the firing chamber is fully pressurized.

17. A method of generating a high amplitude sound wave, the method comprising the steps of:
fixing a piston within a housing with a latch, the piston and housing defining a charging chamber;
providing a firing chamber disposed opposite the piston from the charging chamber;
pressurizing fluid within the firing chamber to exert a first force on the piston;
pressurizing fluid within the charging chamber to exert a second force on the piston; and
releasing the latch to allow the pressurized fluid in the charging chamber to move the piston relative to the housing and generate the sound wave.

18. A method of generating a high amplitude sound wave, the method comprising the steps of:
fixing a piston within a housing with a latch, the piston and housing defining a charging chamber;
providing a disc connected to the piston to form a firing chamber disposed opposite the piston from the charging chamber;
pressurizing fluid within the firing chamber to exert a first force on the piston
pressurizing fluid within the charging chamber to exert a second force on the piston, the first force having a greater magnitude than the second force; and
releasing the latch to allow the force of the pressurized fluid in the charging chamber to move the piston relative to the housing and generate the sound wave.

19. The method of claim 18, wherein the piston is released by allowing fluid to escape the firing chamber until the magnitude of the force exerted on the piston by the fluid in the firing chamber is less than the magnitude of the force exerted on the piston by the fluid in the charging chamber.

20. The method of claim 17, wherein the sound wave is generated in water.

21. The method of claim 17, wherein the focal point of the generated sound wave is varied by controlling a rate of acceleration of the piston.

22. A device for generating a high amplitude sound wave, comprising:
a housing having an open end;
a piston slidably mounted in the housing and defining a charging chamber between the piston and the housing, the charging chamber for holding pressurized fluid acting to exert a first force on the piston;
a disc connected to the piston and forming a firing chamber, the firing chamber for holding pressurized fluid acting to exert a second force on the piston, such that the second force is greater than the first force and prevents the piston from moving relative to the housing; and
a valve for releasing fluid from the firing chamber until the second force is less than the first force and the fluid in the charging chamber acts on the piston to move the piston and disc relative to the housing to generate the sound wave.

23. The device of claim 22, further comprising a pump connected to the charging chamber and to the firing chamber to supply pressurized fluid to both chambers.

24. The device of claim 23, further comprising an intensifier connected between the pump and the firing chamber, the intensifier operable to increase the pressure of the fluid provided to the firing chamber.

25. The device of claim 24, wherein the fluid in the firing chamber is pressurized to about 40 ksi and the fluid in the charging chamber is pressurized to about 20 ksi.

26. The device of claim 22, wherein a shaft connects the disc to the piston, the shaft including grooves configured to vent fluid from the firing chamber when the piston starts to move with respect to the housing.

27. The device of claim 26, further comprising a collar disposed at the open end of the housing, the collar having an opening configured to receive the shaft such that the shaft engages the collar to form a seal when the fluid in the firing chamber is fully pressurized.

28. A system for generating a high amplitude sound wave, comprising:
a frame;
a plurality of housings mounted on the frame, each of the plurality of housings having an open end and slidably mounting a piston to form a charging chamber therein, the charging chamber of each housing for holding a pressurized liquid acting to exert a first force on the piston;
a plurality of discs, each disc connected to a corresponding piston and forming a firing chamber, each firing chamber for holding pressurized fluid acting to exert a second force on a corresponding piston; and
a plurality of valves, each valve configured to release fluid from a corresponding firing chamber until the fluid in a corresponding charging chamber acts on a corresponding piston to move the piston and a corresponding disc relative to a corresponding housing to generate the sound wave.

29. A system for generating a high amplitude sound wave, comprising:
a frame;
a plurality of housings mounted on the frame, each of the plurality of housings having an open end and slidably mounting a piston to form a charging chamber therein, the charging chamber of each housing configured to hold a pressurized liquid, the pressurized liquid within each charging chamber acting on the corresponding piston to move the corresponding piston relative to the housing;
a plurality of latches, one of the plurality of latches disposed on each of the plurality of housings, each of the latches operable to fix one of the pistons relative to one of the housings and to release the one piston, thereby allowing the one piston to move relative to the one housing in response to the force of the pressurized liquid and generate the sound wave;

wherein each latch includes a disc connected to the one piston to form a firing chamber within the one housing, the firing chamber configured to hold pressurized fluid such that the force exerted on the one piston by the fluid in the firing chamber is greater than the force exerted on the one piston by the pressurized fluid in the charging chamber.

30. The system of claim 29, further comprising a pump operable to provide pressurized fluid to the charging chamber and firing chamber of each housing.

31. The system of claim 30, further comprising a low-pressure manifold connecting the pump to the charging chambers of each of the housings and a high-pressure manifold connecting the pump to the firing chambers of each of the housings.

32. The system of claim 29, further comprising a valve in fluid connection with the firing chamber in each housing, the valves operable to individually release fluid from each firing chamber until the force exerted on the piston by the fluid in the respective firing chamber is less than the force exerted on the piston by the respective charging chamber.

33. The system of claim 31, wherein each of the discs have a radiating surface and have a generally hexagonal cross section.

34. The system of claim 33, wherein the radiating surfaces of each of the discs are substantially flat.

35. The system of claim 33, wherein the radiating surfaces of a first group of discs are substantially flat and the radiating surfaces of a second group of discs are angled with respect to the radiating surfaces of the first group.

* * * * *